May 18, 1965  A. A. ANGLEMYER  3,183,911

FETAL EXTRACTOR

Filed Nov. 29, 1962  2 Sheets-Sheet 1

INVENTOR.
ALFRED A. ANGLEMYER
BY

May 18, 1965    A. A. ANGLEMYER    3,183,911
FETAL EXTRACTOR
Filed Nov. 29, 1962    2 Sheets-Sheet 2
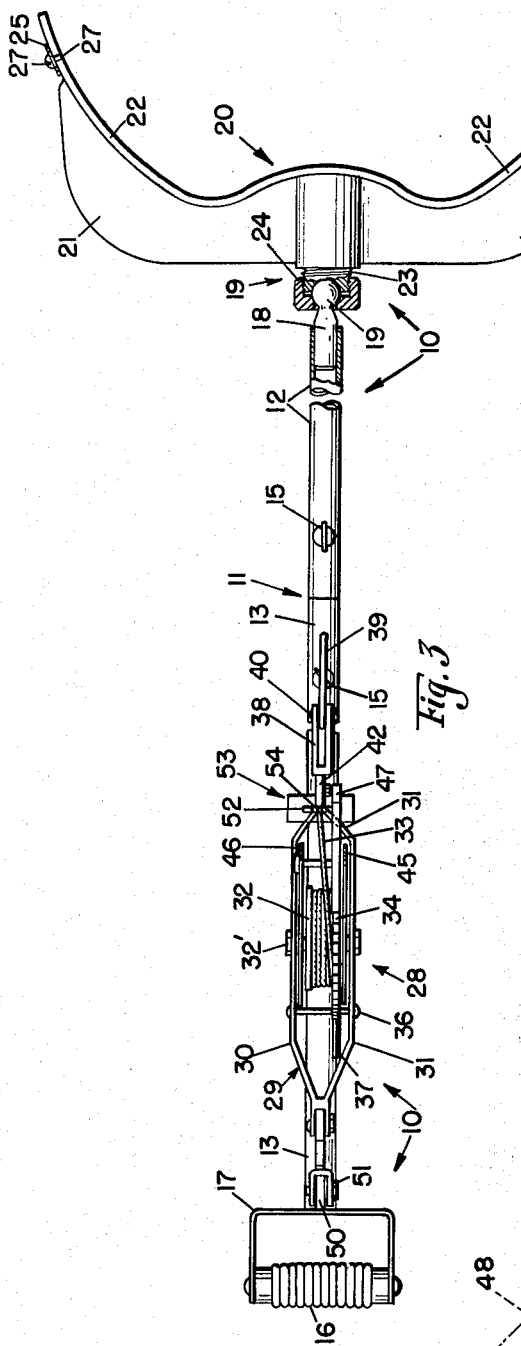
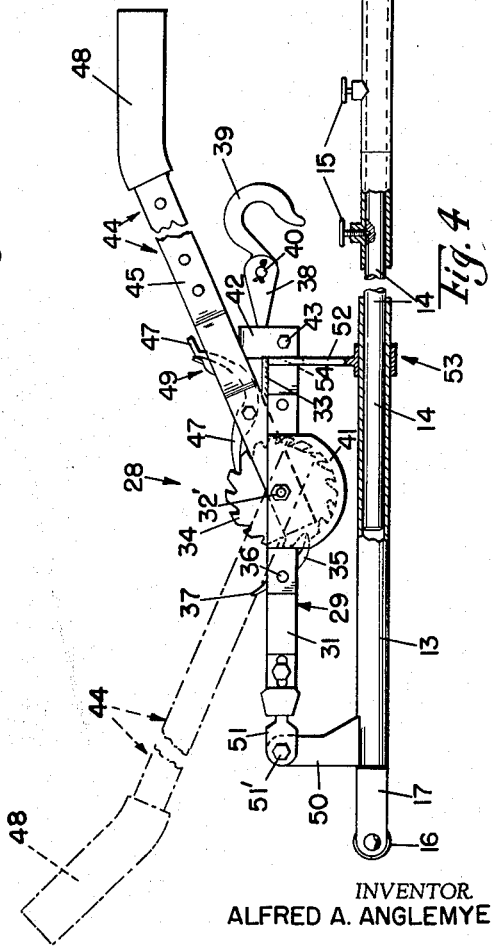
INVENTOR.
ALFRED A. ANGLEMYER
BY

United States Patent Office 3,183,911
Patented May 18, 1965

3,183,911
FETAL EXTRACTOR
Alfred A. Anglemyer, 2585 Evelyn Drive, Dayton, Ohio
Filed Nov. 29, 1962, Ser. No. 240,995
9 Claims. (Cl. 128—353)

The present invention relates to a veterinary fetal extractor and it consists in the combinations, constructions and arrangements of parts herein described and claimed.

Generally there is provided a reel-type cable puller operated by a ratchet wheel and a lever actuated pawl. The cable puller is mounted on one end of a rigid length adjustable bar having a spade-type hand grip fixed to the end thereof adjacent the cable puller. The free end of the reel attached cable is provided with an easily detachable grab hook for engaging between links of an obstetrical chain attached in known manner to the calf or other fetus being delivered.

A rigid W-shaped breechen is provided for fitting the curvatures of the rump of a cow or other animal and is held in place immediately below the birth canal by an adjustable breechen strap or harness passing over the animal's rump and fastened to each end of the breechen. A very important feature of the present invention is the provision of a universal joint connecting the forward end of the puller mounting rod to the center of the breechen whereby the angle of pull can be quickly, easily and widely varied as desired by the veterinarian and whereby injury to the operator, the animal and/or the fetus will be prevented by a fall or other sudden or extreme change in position of the animal being delivered.

It is an object of this invention to provide a fetal extractor comprising a rump spanning breechen, a rod mounted cable puller and a universal joint interconnecting the mounting rod of the cable puller to the breechen for providing lateral and vertical variations in the pull on a fetus and for minimizing the danger of injuries to an operator, the animal and/or the fetus caused by extreme changes in position by the animal being delivered.

It is another object of the invention to provide a device of the character described in which the breechen is contour shaped to increase the efficiency of the operation and the comfort of the animal.

It is a further object of this invention to provide a fetal extractor of the cable puller type in which the cable puller is easily and quickly detachable from the extractor whereby the puller can be used as a puller of general mechanical utility.

Other and further objects of the invention will become apparent from a reading of the following specification taken in conjunction with the drawings, in which:

FIGURE 3 is a plan view of the fetal extractor of FIGURE 2 with the operating lever broken off for clarity of the showing, and FIGURE 4 is an enlarged side elevational view of the disclosure of FIGURE 3, partly in axial section.

Figure 1:
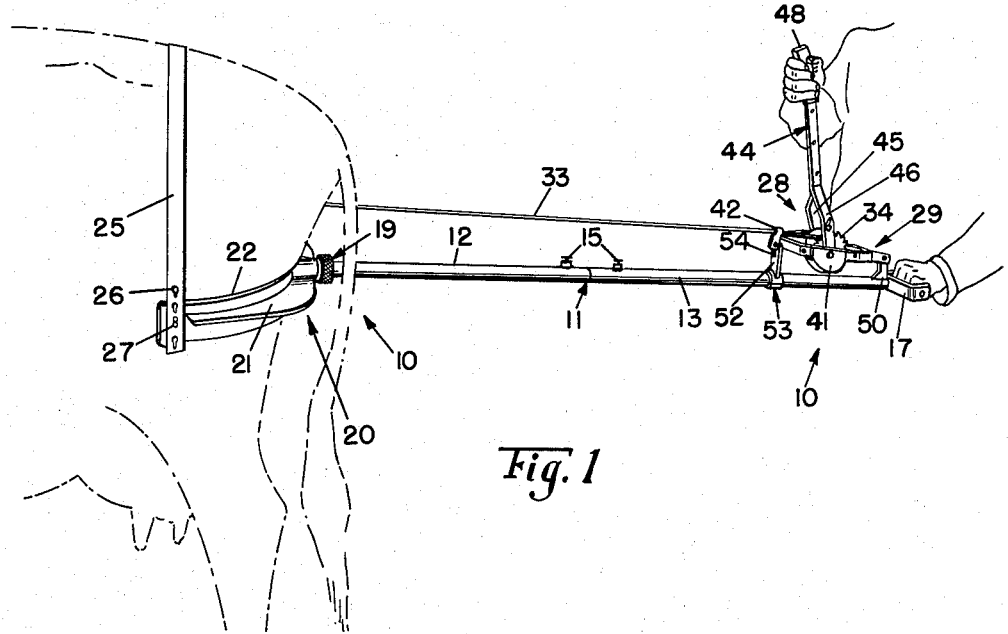
FIGURE 1 is a perspective view of a preferred embodiment of the invention.
Figure 2:
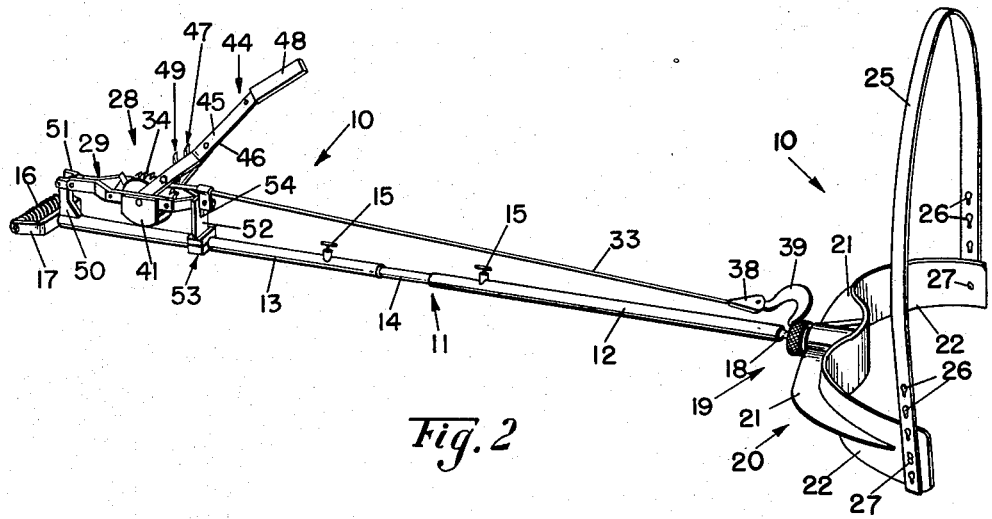
FIGURE 2 is a perspective view of the opposite side of the device of FIGURE 1.

With reference now to the drawings, the numeral 10 generally designates the fetal extractor as a whole. The device 10 comprises a length adjustable rigid base rod 11 consisting of a front tubular element 12 and a rear tubular element 13 telescopically slidably engaged over the ends of a rod 14 to which they are adjustably clamped by a pair of T bolts 15. The rear end of the rear tubular element is spanned by a handle 16 mounted between the ends of a U-shaped bracket 17. The center of the bight portion of the bracket 17 is welded or otherwise rigidly fixed to the end of part 13, as shown.

The front end of the tubular element 12 has firmly fixed therein and extending axially therefrom a post 18. The forward end of the post 18 is shaped to constitute the ball of a ball and socket universal joint, generally designated 19, by which a breechen 20, next to be described, is swivelly attached.

The breechen 20 is desirably a casting of an aluminum alloy or other strong, lightweight and heat resistant material suitable for rough handling and heat sterilization. The breechen 20 has a horizontally disposed rigidifying web portion 21 and an integral W-shaped rump engaging portion 22 of considerable vertical width to insure firm, shape conforming and comfortable engagement against the animal's rump.

The casting constituting the breechen 20 is enlarged and rearwardly axially extended to provide a cylindrical boss 23. The boss 23 is provided with a hemispherical depression in its rear face to constitute a socket for the ball 19. An internally threaded centrally apertured cap 24 engages threads on the boss 23 to complete the generally conventional universal joint 19.

Vertical support for the breechen is provided by a strap 25 of nylon or other suitable flexible material. Each end of the strap 25 has a series of keyhole-shaped apertures 26 therein for selective engagement over headed pins 27 in adjusting the height of the breechen 20.

The numeral 28 generally designates a cable puller, which is quickly and easily detachably mounted on the rear end of the tubular element 13 so as to be removable therefrom for use as a device of general utility as a lift, a fence stretcher, etc. The cable puller 28 comprises a frame 29 formed of two parallel side elements 30 and 31 the ends of which are brought together and rigidly interconnected. A reel 32 is mounted between the frame elements 30 and 31 on a shaft 32'. A pull cable 33 is fixed at one end to the hub of the reel 32 for winding and unwinding of the cable as the reel is turned.

A ratchet wheel 34 is coaxially fixed to one end of the reel 32. A spring pressed pawl 35, pivoted on a pin 36, prevents clockwise (FIG. 4) unwinding of the cable but permits counterclockwise winding up thereof. A finger engageable extension 37 of the pawl 35 permits manual control of the releasing of the cable. The free end of the cable 33 has fixed thereto a bifurcated connector 38 to which a hook 39 (or other type of coupler, not shown) is easily detachably pivotally attached by a pin 40. The under surfaces of the reel 32 and the ratchet wheel 34 are desirably covered by a cup-shaped guard 41 fixed to the frame 29 by conventional means (not shown). An inverted U-shaped strap 42 serves as a cable guide, being fastened to the front end of the frame 29 by a bolt 43.

The ratchet wheel 34 is rotated by a lever 44 formed of a pair of straps 45 and 46 riveted together to form the shank portion thereof and spread apart at their lower ends to straddle the reel 32 and the ratchet wheel 34. Said lower ends of the straps 45 and 46 have aligned apertures forming bearings pivotally mounting the lever 44 on the reel shaft 32'. A spring pressed ratchet 47 engages the teeth of the ratchet wheel 34 as the lever 44 is pulled toward the operator by a handle 48 on the end of the lever. This rotates the reel 32 winding up and pulling the cable 33 toward the operator. The pawl 35 holds the reel against reverse rotation as the lever is pushed forwardly, the ratchet camming past the teeth on the ratchet wheel 34 on the return stroke. The numeral 49 generally designates a two position ratchet control of known construction which is operable to permit step-by-step unwinding of the cable while under working tension.

The cable puller 28 is easily and quickly detachably connected to the tubular element 13 by a post 50 welded or otherwise fixed thereto. A bifurcated fixture 51 fastened to the rear end of the frame 29 straddles the upper end of the post 50 and is attached thereto by a bolt 51 passing through aligned apertures in the top of said post and in the two webs of the fixture 51 straddling the post. A second post 52, having a horizontally split base 53 clamped around the tubular element 13, supports the forward end of the frame 29 in a vertical slot 54 in the upper end of the post 52.

While but one form of the invention has been shown and described herein, it will be readily apparent to those skilled in the art that many minor modifications may be made without departing from the spirit of the invention or the scope of the appended claims.

What is claimed is:

1. A veterinary fetal extractor comprising: a horizontally extending breechen member for contacting the body of an animal, an elongated rigid base member, means swivelly connecting one end of said base member to the midpoint of said breechen member for relative lateral and vertical adjustment therebetween, a cable puller including operating means therefor connected to the opposite end of said base member, a pull cable extending from said cable puller toward said breechen member, and a connector on the free end of said cable for attachment to a fetus.

2. Structure according to claim 1, said base member comprising a plurality of telescopically interengaged elements and means for locking said elements in selected relative positions thereof to vary the length of said base member.

3. Structure according to claim 1, said base member having a spade-type handle fixed to the rear end thereof.

4. Structure according to claim 1, said breechen member having a front face W-shaped in plan view and of considerable vertical width for efficient placement thereof and increased animal comfort.

5. Structure according to claim 1 additionally comprising a flexible strap positionable over the rump of an animal and longitudinally adjustable connected at its ends to lateral portions of said breechen member.

6. Structure according to claim 1, said cable puller comprising a cable reel, a ratchet wheel coaxially fixed to said reel, a manually releasable pawl for normally preventing unwinding of the cable on said reel, a lever pivoted at the axis of said reel, and a ratchet carried by said lever and positioned for engaging said ratchet wheel for stepwise rotation of said reel by said lever.

7. Structure according to claim 1 additionally comprising a pair of radially disposed and longitudinally aligned posts fixed to said base member for connecting said cable puller thereto, and means for quickly and easily detachably connecting said cable puller to said posts, whereby said cable puller can be removed from said base member for use as a cable puller of general utility.

8. Structure according to claim 7, said last-mentioned means comprising a bolt fastening the rear portion of said cable puller to the rearmost of said posts, the other post being longitudinally and medially slit to straddle and thus position a forward portion of said cable puller.

9. A veterinary fetal extractor comprising: a breechen member, an elongated rigid base member, universal joint means, connecting one end of said base member to said breechen member centrally thereof, a cable puller firmly fixed to said base member remote from said breechen member, a pull cable extending from said cable puller toward said breechen member, and a connector on the free end of said cable for attachment to a fetus, said universal joint means comprising a threaded cylindrical boss on said breechen member, a coaxially extending rod fixed to the front end of said base member and having a ball head thereon, a hemispherical coaxial socket in the end of said boss receiving said ball head therein, and a threaded centrally apertured cap holding said ball head in said socket with adjustable joint pressures to vary the flexibility of said joint as desired.

References Cited by the Examiner
UNITED STATES PATENTS

| | | | |
|---|---|---|---|
| 1,885,945 | 11/32 | Ransy | 128—252 |
| 2,654,368 | 10/53 | Matteson | 128—352 |
| 2,692,600 | 10/54 | Curyea | 128—352 |
| 2,791,219 | 5/57 | Bowie | 128—352 |
| 3,113,571 | 12/63 | Jeeninga | 128—252 |

RICHARD A. GAUDET, *Primary Examiner.*

JORDAN FRANKLIN, *Examiner.*